Patented June 30, 1953

2,643,991

UNITED STATES PATENT OFFICE 2,643,991

INTERPOLYMERS OF SELECTED 2-ALKENYL 2-ALKENOATES OR LIKE ESTERS WITH SELECTED 2-ALKENYL OR LIKE CHLORIDES, ETHERS OR ESTERS WITH OR WITHOUT A DIFFERENT COPOLYMERIZABLE MONOOLEFINIC COMPOUND

Pliny O. Tawney, Passaic, N. J., assignor to United States Rubber Company, New York, N. Y., a corporation of New Jersey No Drawing. Application January 28, 1949, Serial No. 73,437

5 Claims. (Cl. 260—80.5)

My invention is a new class of soluble, unsaturated convertible resins obtained by the copolymerization of a 2-alkenyl 2-alkenoate or like esters with a 2-alkenyl or like compound from the class of 2-alkenyl or like chlorides, 2-alkenyl or like monoethers of aliphatically saturated alcohols, and 2-alkenyl or like esters or aliphatically saturated mono-carboxylic acids in the presence or absence of a different copolymerizable monoolefinic compound. Such resins are useful in a variety of applications since they can be readily cured to an insoluble, infusible state by further polymerization or by copolymerization with suitable olefinic compounds.

Prior to the present invention, the polymerization and the copolymerization of 2-alkenyl 2-alkenoates were known to yield insoluble gels before more than a minor amount of the 2-alkenyl 2-alkenoate had been converted to the polymeric form. The resulting intractable mixtures of gel, unreacted monomer and low molecular weight polymers are difficult to manipulate in subsequent processing and indeed enjoy little or no commercial utility, since for many processes, e. g., coating or molding, an initially soluble, fusible resin is required which, after application, can be converted to an insoluble and substantially infusible state. Halting the polymerization or copolymerization prior to gelation yields a soluble polymer, albeit in very low yields. Nor has the prior art been successful in improving the economic efficacy of the process through the use of large amounts of diluents, high reaction temperatures, inhibitors, etc. Such devices effect only small or insignificant increases in the yield of such soluble polymers and introduce the necessity for further purification steps in order to remove catalyst fragments, diluents, inhibitors, etc.

However, as a result of my discovery of the interpolymerization of the 2-alkenyl 2-alkenoates or like esters with the above defined 2-alkenyl or like compounds, the major proportion of the former can now be readily converted to the soluble polymeric form without danger of gelation.

The interpolymerizable 2-alkenyl or like compounds employed in my invention have the type formula RCH=CH—CH$_2$—X where one R is hydrogen, while the other R is one of the radicals hydrogen, chlorine, methyl, ethyl, chloromethyl and phenyl; and X is one of the radicals chlorine, alkoxy (e. g., methoxy, ethoxy, beta-hydroxyethoxy, propoxy, isopropoxy, n-butoxy, isobutoxy, amyloxy, hexoxy, heptoxy, octoxy, nonoxy, decoxy), cycloalkoxy (e. g., cyclohexoxy), aryloxy (e. g., phenoxy and tolyloxy), aralkoxy (e. g., benzyloxy), and acyloxy (e. g., acetoxy, propionoxy, isobutyroxy, valeroxy and benzoyloxy). Where X is an organic radical it is one which is devoid of aliphatic unsaturation. Illustrative of suitable 2-alkenyl or like compounds are allyl chloride, methallyl chloride, crotyl chloride, 2,3-dichloropropene, 1,4-dichlorobutene-2,2-(chloromethyl) allyl chloride, cinnamyl chloride, allyl methyl ether, methallyl ethyl ether, beta-allyloxyethanol, allyl propyl ether, ethallyl phenyl ether, methallyl butyl ether, methallyl amyl ether, methallyl heptyl ether, allyl octyl ether, crotyl ethyl ether, 2-chlorallyl ethyl ether, methallyl phenyl ether, allyl benzyl ether, allyl acetate, 2-chlorallyl propionate, methallyl butyrate, ethallyl valerate, and cinnamyl acetate.

Of the 2-alkenyl compounds, I have found the 2-alkenyl chlorides to be the most effective in repressing gelation of a polymerizing 2-alkenyl 2-alkenoate or mixtures thereof with various copolymerizable monoolefinic compounds. The 2-alkenyl chloride interpolymers are particularly useful where products of decreased flammability are desired, although such materials are somewhat inferior to the interpolymers of the 2-alkenyl ethers and 2-alkenyl carboxylic acid esters in regard to their resistance to discoloration at high temperatures. For optimum resistance to wetting and attack by hydrophilic solvents, the interpolymers of the 2-alkenyl ethers of saturated monohydric alcohols are preferred, although in many cases the interpolymers of the 2-alkenyl esters of saturated monocarboxylic acids have proven nearly equivalent in this respect. Both the 2-alkenyl ethers and the 2-alkenyl carboxylic esters are likewise useful in endowing the resulting copolymers with improved flexibility, and this effect can be enhanced by the use of the 2-alkenyl ethers and esters of long chain alcohols and of long chain carboxylic acids, respectively. The interpolymers derived from the 2-alkenyl monoesters are notably soft and flexible and are particularly useful as non-fugitive plasticizers for other polymeric materials.

I have found that, in the practice of my invention, the presence of as little as 0.2 mole of the 2-alkenyl chloride, monoether or monoester (per mole of the 2-alkenyl 2-alkenoate) is sufficient to secure an increased conversion of the latter to the soluble polymeric form. This conversion is further increased as the amount of the monoenic 2-alkenyl compound initially present is increased, until, when approximately 3 to 5 moles of the monoenic 2-alkenyl compound are present, a major proportion of the 2-alkenyl 2-alkenoate is converted to soluble interpolymer, and even higher conversions of the 2-alkenyl 2-alkenoate to soluble polymeric form can be attained in the presence of larger amounts of monoenic 2-alkenyl compound, e. g., 7–10 moles or even more.

Suitable 2-alkenyl 2-alkenoates and like esters which can be interpolymerized with the above-described 2-alkenyl or like compounds are those having the type formula $$R^*CH=CH^*-CH_2-O-CO-CR^\phi=CHR^\phi$$

wherein one $R^*$ and one $R^\phi$ are hydrogen while the other $R^*$ and $R^\phi$ are hydrogen, chlorine, methyl or phenyl. Illustrative of such compounds are allyl acrylate, allyl methacrylate, methallyl acrylate, allyl chloroacrylate, allyl crotonate, cinnamyl acrylate, allyl cinnamate, and chlorallyl chloroacrylate. Those compounds in which the terminal $R^*$ and $R^\phi$ are hydrogen are preferred.

As previously mentioned, various other polymerizable monoolefinic compounds can likewise be present in the initial reactant mixture along with the 2-alkenyl 2-alkenoates and the monoenic 2-alkenyl compounds as defined above. The inclusion of a third copolymerizable compound permits numerous variations in the properties of the resulting soluble, unsaturated resins to be attained. For example, the copolymerization of the 2-alkenyl 2-alkenoate and a 2-alkenyl alcohol, ether or ester with an olefin such as styrene, vinylnaphthalene or isobutylene yields resins of improved compatibility with cheap hydrocarbon solvents, an important factor in the formulation of commercial surface coatings. Copolymerization of the 2-alkenyl 2-alkenoate and the monoenic 2-alkenyl compound with halogenated monoolefinic compounds such as vinyl chloride, vinylidene chloride and the dichlorostyrenes yields polymeric materials of increased flame-resistance and often of greater hardness. Products of greater hardness can also be produced by the ternary copolymerization with a compound of the class of olefinic acid nitriles, amides, and imides, e. g., acrylonitrile and methacrylamide, as the third copolymerizable monomer. On the other hand, softer and more flexible products can usually be obtained by the ternary copolymerization with olefinic acid esters of saturated monohydric alcohols, such as the acrylates, methacrylates, maleates, fumarates, itaconates, mesaconates, and aconitates of such alcohols, particularly such esters derived from alcohols containing a chain of two or more carbon atoms, e. g., ethanol, 1-butanol, 2-ethyl-1-hexanol and 1-octanol.

A wide variety of monoolefinic compounds are operable in my invention as the third copolymerizable reactant, including those of the type formula $R'R''C=R'''R''''$ wherein $R'$ may be hydrogen, fluorine or methyl;

$R''$ may be hydrogen, fluorine, carboxyl, or a radical hydrolyzable to carboxyl such as carboalkoxy (e. g., carbomethoxy, carboethoxy and carbohexoxy), carboaryloxy (e. g., carbophenoxy and carbotolyloxy), carbaralkoxy (e. g., carbobenzyloxy), carbamyl, N-alkylcarbamyl (e. g., N-methylcarbamyl), N-arylcarbamyl (e. g., N-phenylcarbamyl), and carbonitrilo;

$R'''$ may be hydrogen, lower alkyl (e. g., methyl and ethyl), chlorine, fluorine, carboxyl, or a radical hydrolyzable to carboxyl as defined above;

$R''''$ may be hydrogen, methyl, chlorine, fluorine, aryl (e. g., phenyl, p-chlorophenyl, tolyl and naphthyl), carboxyl, a radical hydrolyzable to carboxyl, alkoxy (e. g., methoxy, ethoxy, propoxy, isopropoxy, butoxy, amyloxy, hexoxy, heptoxy, octoxy, nonoxy and decoxy), aryloxy (e. g., phenoxy, tolyloxy, naphthoxy, p-chlorophenoxy, and p-methoxyphenoxy), aralkoxy (e. g., benzyloxy), acyloxy where the acyl group is devoid of olefinic and acetylenic unsaturation, i. e. alkanoyloxy, aroyloxy and aralkanoyloxy (e. g., acetoxy, propionoxy, butyroxy and benzoyloxy), acyl as previously defined (e. g., acetyl, propionyl, isobutyryl and benzoyl); and $R''''$ may additionally be carboxymethyl or a radical hydrolyzable thereto when $R'''$ is carboxyl or a radical hydrolyzable thereto; and $R'''$ may together with $R''$ comprise a carbanhydro group $-CO-O-CO-$, or an imide group $-CO-NR+-CO-$, where $R+$ is one of the radicals hydrogen, alkyl (e. g., methyl, ethyl, propyl, isopropyl, butyl, isobutyl, amyl, hexyl, heptyl, octyl, nonyl, decyl), cycloalkyl (e. g., cyclopentyl, cyclohexyl), aryl (e. g., phenyl, tolyl, xylyl, xenyl, naphthyl), or aralkyl (e. g., benzyl, phenethyl).

Of these copolymerizable monoolefinic compounds the following classes are especially preferred:

Class A:

$$CH_2=CR'''R''''$$

where $R'''$ is hydrogen or methyl, and $R''''$ is chlorine, fluorine, aryl, acyloxy, alkoxy, aryloxy, aralkoxy, carbalkoxy, carbonitrilo, carbamyl, or acyl Class B:

$$CH_2=CR'''R''''$$

where $R'''$ and $R''''$ are identical substituents from the class of methyl, chlorine, fluorine, carbalkoxy and carbonitrilo Class C:

$$R'R''C=CR'''R''''$$

where $R'$ and $R'''$ are hydrogen or methyl, and $R''$ and $R''''$ are carbalkoxy or carbonitrilo.

Exemplary of such compounds are isobutylene, styrene, p-chlorostyrene; vinyl chloride, vinylidene chloride; the vinyl esters of the saturated aliphatic (particularly the lower aliphatic) monocarboxylic acids such as vinyl acetate, vinyl chloroacetate, vinyl trichloroacetate, vinyl propionate, vinyl butyrate; methyl vinyl ketone; the acrylic esters of the saturated aliphatic (particularly the lower aliphatic) monohydric alcohols such as methyl acrylate, n-butyl methacrylate, octyl acrylate, n-butyl acrylate, tolyl acrylate, benzyl acrylate, methyl methacrylate, beta-chloroethyl acrylate, ethyl alpha-chloroacrylate; acrylamide, N-methylacrylamide, acrylonitrile, methacrylonitrile, fumaronitrile; the esters of alpha-olefinic polycarboxylic acids with saturated monohydric alcohols such as diethyl fumarate, bis(beta-chloroethyl) fumarate, dibutyl fumarate, bis(2-ethylhexyl) fumarate, dimethyl itaconate, diethyl itaconate, dihexyl itaconate, dicyclohexyl itaconate etc., as well as the corresponding esters of mesaconic, citraconic and aconitic acids; dibutyl maleate, maleimide, N-butylmaleimide; the vinyl alkyl ethers such as n-butyl vinyl ether, hexyl vinyl ether; phenyl vinyl ether, and benzyl vinyl ether.

In the practice of my invention, the 2-alkenyl 2-alkenoate is heated at 25° to 120° C., preferably at 60° to 100° C., together with from 0.2 to 12 molar equivalents of the monoenic 2-alkenyl compound and with from 0 to 6.0 molar equivalents of the copolymerizable monoolefinic third compound. The reaction is promoted by a source of free radicals such as an organic peroxide, e. g., benzoyl peroxide, acetyl peroxide, the amount thereof being usually in the range of from 0.1 to 10%, preferably from 0.1 to 5% (by weight) of the reactant mixture. Any organic peroxide which generates free radicals under the conditions of heating may be used. The course of the interpolymerization can be followed by observing the increase in the viscosity of the reaction mixture, and the product can be isolated by removal of any unreacted starting materials by preferential extraction or by distillation. Although it is unnecessary for most commercial applications, the interpolymers can be further purified if necessary, as for analytical purposes, by solution in a minimum volume of solvent, e. g., acetone, and precipitation by dilution with an excess of n-hexane. By concentration of the precipitating bath, a certain amount of copolymers of low molecular weight can sometimes be The following examples disclose my invention in more detail. All parts are by weight.

EXAMPLE 1

Mixtures of 2-alkenyl 2-alkenoates and monoenic 2-alkenyl compounds are heated at 60° C. with benzoyl peroxide as a promoter until the point of incipient gelation is attained in each case. The reaction mixtures are then diluted with an excess of n-hexane and the precipitated interpolymers are further purified by solution in a minimum volume of acetone and precipitation with n-hexane. They are finally dried in vacuo to constant weight. Table I summarizes the amounts of the copolymerizable starting materials, the peroxide and the polymeric product, together with the reaction times. To further emphasize the advantages of my invention, the polymerization of the 2-alkenyl 2-alkenoates in the absence of any monoenic 2-alkenyl compounds is included (I–1, I–13, I–20 and I–22) which illustrates the inadequacies of the methods suggested by the prior art.

Table I

| | 2-Alkenyl, 2-Alkenoate | | 2-Alkenyl Compound | | Benzoyl Peroxide | Tert-Butyl Hydrogen Peroxide | Reaction Time (Hrs.) | Polymeric Product |
|---|---|---|---|---|---|---|---|---|
| 1 | AllylAcrylate | 100 | | | 0.2 | | 2.0 | 7.83 |
| 2 | do | 100 | Methallyl Chloride | 81.4 | 0.45 | | 5.3 | 44.0 |
| 3 | do | 100 | do | 121.0 | 2.68 | | 3.5 | 77.0 |
| 4 | do | 100 | do | 163.0 | 6.5 | | 10.75 | 117.0 |
| 5 | do | 100 | do | 330.0 | 11.0 | | *400.0 | 209.0 |
| 6 | do | 100 | 2-Chloroallyl Chloride | 24.4 | 0.13 | | 1.75 | 11.0 |
| 7 | do | 100 | do | 49.0 | 0.045 | | 5.1 | 21.4 |
| 8 | do | 100 | do | 49.0 | 0.214 | | 2.3 | 20.8 |
| 9 | do | 100 | do | 100.0 | 0.43 | | 20.5 | 36.0 |
| 10 | do | 100 | do | 149.0 | 1.07 | | 41.0 | 79.0 |
| 11 | do | 100 | do | 185.0 | 1.23 | | 38.5 | 99.0 |
| 12 | do | 100 | do | 230.0 | 3.56 | | 27.0 | 133.0 |
| 13 | Allyl Methacrylate | 100 | | | 0.02 | | 0.75 | 4.07 |
| 14 | do | 100 | Methallyl Chloride | 73.0 | 0.38 | | 31.1 | 75.1 |
| 15 | do | 100 | 2-Chloroallyl Chloride | 91.0 | 1.93 | | 21.8 | 82.5 |
| 16 | do | 100 | 2-Chloromethylallyl Chloride | 99.0 | 3.78 | | 11.8 | 67.3 |
| 17 | Allyl Acrylate | 100 | Methallyl Ethyl Ether | 52.3 | 3.6 | | 0.75 | 24.4 |
| 18 | do | 100 | Methallyl Acetate | 152.0 | 5.38 | | 0.75 | 40.3 |
| 19 | Allyl Methacrylate | 100 | Allyl Acetate | 119.0 | 4.8 | | 0.8 | 26.2 |
| 20 | Allyl Crotonate φ | 100 | | | 2.0 | 0.75 | *216 | 30.8 |
| 21 | Allyl Crotonate | 100 | Allyl Chloroacetate | 100 | 2.0 | 0.75 | *216 | 97.02 |
| 22 | Allyl Cinnamate φ | 100 | | | 1.0 | 0.55 | *168 | 31.5 |
| 23 | do | 100 | Allyl Chloroacetate | 100 | 1.0 | 0.55 | *208 | 59.5 |

*=no sign of incipient gelation.
φ=run at 90° C.

isolated and these are likewise useful in various applications.

My new interpolymers can be employed in the solid form for thermosetting molding powders. They may likewise be employed together with diluents for coating, laminating and impregnating operations particularly where flexible films of high color stability are desired. In such applications, the crude interpolymerization reaction mixtures themselves may be employed by the use of a suitable high-boiling solvent and subsequent removal of any of the unreacted 2-alkenyl compound by distillation. Fluid molding and coating compositions can likewise be obtained by dissolving my interpolymers in a liquid, ethylenically unsaturated copolymerizable compound such as diethyl fumarate, styrene, vinyl butyrate, or diallyl fumarate. These solutions are capable of total polymerization, leaving no solvent to be evaporated, and are particularly useful where removal of the solvent constitutes a technical hazard or where minimum shrinkage in the resulting product is desired. Inert addends such as dyes, pigments, fillers and plasticizers can be incorporated with my interpolymers, preferably at the soluble, fusible stage prior to the final cure.

From Table I it is apparent that the polymerization of a 2-alkenyl 2-alkenoate in the presence of even a small amount of 2-alkenyl chloride, monoether or monoester effects a very significant increase in the amount of the former compound which can be converted to the soluble polymeric form before gelation. It is likewise apparent that the conversion of the 2-alkenyl 2-alkenoate to soluble interpolymer is increased as the amount of the monoenic 2-alkenyl compound present is increased until a major proportion of the former can be converted to the soluble polymeric form without danger of insolubilization.

The product of I–15 contains 11.49% by weight of chlorine which indicates a copolymer containing about 82.0% by weight of allyl methacrylate and 18% of 2-chloro-allyl chloride.

EXAMPLE 2

A mixture of 67.2 parts of allyl acrylate, 126.7 parts of methallyl chloride and 4.8 parts of benzoyl peroxide is heated at 60° C. for about 21 hours. The reaction mixture is then evaporated to a viscous syrup which is poured into an excess of n-hexane to precipitate 82.6 parts (dry weight) of a soft, polymeric solid.

Analysis: C, 60.57%; H, 7.50%; Cl, 14.22%; iodine number (Wijs), 121.9.

The analysis indicates a copolymer containing approximately 64% by weight of allyl acrylate and 36% by weight of methallyl chloride.

EXAMPLE 4

Interpolymerizations of 2-alkenyl 2-alkenoates, 2-alkenyl chlorides, monoethers and monoesters, and copolymerizable monoolefinic compounds are carried out in the manner of Example 1 above.

*Table II*

| | 2-Alkenyl 2-Alkenoate | | Copolymerizable Monolefinic Compound | | 2-Alkenyl Compound | | Benzoyl Peroxide | Reaction Time (Hrs.) | Polymeric Product |
|---|---|---|---|---|---|---|---|---|---|
| 1 | Allyl Acrylate | 100 | Styrene | 50 | | | 0.02 | 2.3 | 3.16 |
| 2 | do | 100 | do | 50 | Methallyl Chloride | 400 | 1.6 | *575.0 | 103.0 |
| 3 | do | 100 | do | 100 | | | 0.04 | 2.9 | 15.4 |
| 4 | do | 100 | do | 100 | Methallyl Chloride | 400 | 1.6 | *575.0 | 158.5 |
| 5 | do | 100 | do | 50 | Methallyl Ethyl Ether | 100 | 4.0 | 7.78 | 76.0 |
| 6 | do | 100 | do | 92.5 | | | 4.31 | 1.8 | 30.8 |
| 7 | do | 100 | do | 92.5 | Methallyl Acetate | 51.0 | 5.38 | 2.5 | 46.1 |
| 8 | do | 100 | do | 93.5 | do | 304.0 | 10.7 | 7.75 | 224.0 |
| 9 | do | 100 | do | 92.5 | Allyl Acetate | 136.0 | 7.23 | 3.5 | 95.0 |
| 10 | do | 100 | Vinyl n-butyl Ether | 50 | | | 0.4 | 1.25 | 3.45 |
| 11 | do | 100 | do | 50 | Methallyl Chloride | 100 | 4.0 | *56.0 | 77.0 |
| 12 | do | 100 | Vinyl Acetate | 50 | | | 0.4 | 5.7 | 1.2 |
| 13 | do | 100 | do | 50 | Methallyl Chloride | 100 | 4.0 | 4.2 | 75.5 |
| 14 | do | 100 | Methyl Acrylate | 100 | | | 0.2 | 2.0 | 2.6 |
| 15 | do | 100 | do | 100 | Methallyl Chloride | 50 | 0.3 | 1.1 | 31.2 |
| 16 | do | 100 | do | 100 | do | 400 | 1.0 | *575.0 | 274.0 |
| 17 | do | 100 | do | 100 | Methallyl Ethyl Ether | 400 | 2.0 | 13.3 | 188.0 |
| 18 | do | 100 | do | 100 | (φ) | 400 | 0.02 | 1.25 | 9.6 |
| 19 | do | 100 | Diethyl Fumarate | 50 | | | 0.02 | 2.75 | 15.55 |
| 20 | do | 100 | do | 50 | Methallyl Chloride | 50 | 0.4 | 4.1 | 30.2 |
| 21 | do | 100 | do | 50 | do | 200 | 0.8 | 117.0 | 139.5 |
| 22 | Allyl Methacrylate | 100 | Dimethyl Itaconate | 100 | | | 0.3 | 1.8 | 35.4 |
| 23 | do | 100 | do | 400 | Methallyl Ethyl Ether | 100 | 2.4 | 26.0 | 168.5 |

φ—Replaced by equal weight of benzene.
*—No evidence of incipient gelation.

Ten parts of the resin of Example 2 are dissolved in 4.5 parts of styrene together with 0.09 part of benzoyl peroxide and the mixture is cured in a mold by heat for 48 hours at 60° C. and then for 5 hours at 120° C. The resulting clear, tough resilient casting has a Rockwell hardness of L-74, M-55 and P-54.

EXAMPLE 3

A mixture of 56.1 parts of allyl acrylate, 515 parts of methallyl acetate and 2.42 parts of benzoyl peroxide is heated for 3 hours at 120° C., and then to the reaction mixture are added 2.42 additional parts of peroxide and the reaction is continued at about 70°–80° C. for 43 hours more. The reaction mixture is processed in the manner of Example 2 to yield 118.7 parts of polymeric solid. A 60% solution of the interpolymer in acetone has a viscosity of 11 poises at 25° C.

A solution of the polymer in cyclohexanone is poured on a sheet of tin plate and baked at 200° C. for 1 hour. The resulting solvent- and heat-resistant film is clear and colorless, and adheres tenaciously to the metal even under vigorous flexing.

Seven parts of the interpolymer are dissolved in 3 parts of allyl acrylate together with 0.4 part of benzoyl peroxide, and the mixture is cured in a mold for 20 hours at 60° C. and then for 140 hours at 100° C. to yield a solvent- and heat-resistant casting having a Rockwell hardness of M-100.

Although preceding examples have disclosed only the copolymerization of a 2-alkenyl 2-alkenoate with a 2-alkenyl chloride, monoether or monoester, my invention is likewise applicable to the ternary interpolymers thereof with copolymerizable monoolefinic compounds as indicated below.

The details of the reactions are summarized in Table II.

EXAMPLE 5

A mixture of 100 parts of allyl acrylate, 200 parts of methallyl ethyl ether, 25 parts of beta-chloroethyl acrylate and 3.5 parts of benzoyl peroxide is heated at 60° C. for 2 hours. The interpolymeric product is then isolated and purified as in previous examples to yield 54.4 parts of polymeric solid which contains 4.5% by weight of chlorine and has an iodine number of 98.

A solution of 5.75 parts of the ternary interpolymer of Example 5 in 1.10 parts of diethyl fumarate containing 0.10 part of benzoyl peroxide is poured into a cylindrical mold and cured by heating at 60° C. for 20 hours and then at 90° C. for one additional hour. The resulting hard, clear casting is insoluble in acetone and ethanol.

EXAMPLE 6

A mixture of 30 parts of allyl methacrylate, 30 parts of styrene, 100 parts of methallyl chloride and 1.5 parts of benzoyl peroxide is heated at reflux for 10 hours. The reaction mixture is then treated in the manner of previous examples to yield 44 parts of ternary interpolymer containing 3.19% of chlorine. Upon being heated at 200° C. the interpolymer is converted to a solvent- and heat-resistant state.

EXAMPLE 7

A mixture of 100 parts of allyl acrylate, 92.5 parts of styrene, 915.0 parts of methallyl acetate and 4.3 parts of benzoyl peroxide is heated at about 95° C. for 3 hours at which time 4.3 parts of peroxide are added and the reaction is continued for 3 hours more. The interpolymer is isolated and purified as in previous examples to yield 192 parts of polymeric solid. A solution of 7 parts of interpolymer in 3 parts of allyl acrylate which also contains 0.4 part of benzoyl peroxide is cured in a mold to 60° C. for 16 hours and then at 100° C. for 5 hours. The resulting clear, colorless solvent-resistant casting has a Rockwell hardness of M-90.

Having thus described my invention, what I claim and desire to protect by Letters Patent is:

1. An acetone-soluble, heat-convertible, unsaturated, resinous, mass interpolymer of monomers consisting of (A) an ester selected from the group consisting of allyl acrylate, allyl methacrylate, allyl crotonate and allyl cinnamate, (B) from 3 to 12 moles per mole of (A) of a compound selected from the group consisting of methallyl chloride, 2-chloroallyl chloride, 2-chloromethylallyl chloride, methallyl ethyl ether, allyl acetate, and allyl chloroacetate, and (C) up to 6 moles of a copolymerizable monoolefinic compound selected from the group consisting of styrene, vinyl alkyl ethers, vinyl esters of saturated aliphatic monocarboxylic acids, acrylic esters of saturated aliphatic monohydric alcohols, and esters of alpha-olefinic polycarboxylic acids with saturated aliphatic monohydric alcohols.

2. An acetone-soluble, heat-convertible, unsaturated, resinous mass interpolymer of monomers consisting of (A) allyl acrylate and (B) from 3 to 12 moles per mole of (A) of methallyl chloride.

3. A soluble, unsaturated, convertible ternary interpolymer of monomers consisting of (A) allyl acrylate, (B) methallyl chloride and (C) styrene, the amount of (B) ranging from 0.2 to 12 moles per mole of (A) and the amount of (C) ranging up to 6.0 moles per mole of (A).

4. The method which consists in heating at a temperature of from 25° to 120° C. a mixture consisting of (A) an ester selected from the group consisting of allyl acrylate, allyl methacrylate, allyl crotonate and allyl cinnamate, (B) from 3 to 12 moles per mole of (A) of a compound selected from the group consisting of methallyl chloride, 2-chloroallyl chloride, 2-chloromethylallyl chloride, methallyl ethyl ether, allyl acetate, and allyl chloroacetate, (C) up to 6 moles of a copolymerizable monoolefinic compound selected from the group consisting of styrene, vinyl alkyl ethers, vinyl esters of saturated aliphatic monocarboxylic acids, acrylic esters of saturated aliphatic monohydric alcohols, and esters of alpha-olefinic polycarboxylic acids with saturated aliphatic monohydric alcohols, and (D) an organic peroxide which is a source of free radicals and thereby converting a major proportion of (A) to soluble, unsaturated, heat-convertible, resinous interpolymeric form and terminating the polymerization prior to the onset of gelation.

5. The method which consists in heating a mixture of monomers consisting of (A) allyl acrylate, (B) methallyl chloride and (C) styrene, at a temperature of from 25° to 120° C. in the presence of an organic peroxide polymerization catalyst, the amount of (B) ranging from 0.2 to 12 moles per mole of (A) and the amount of (C) ranging up to 6.0 moles per mole of (A), halting the polymerization before the gel point, and thereby effecting formation of a soluble, unsaturated, convertible ternary interpolymer of (A), (B) and (C).

PLINY O. TAWNEY.

References Cited in the file of this patent

UNITED STATES PATENTS

| Number | Name | Date |
|---|---|---|
| 2,332,461 | Muskat et al. | Oct. 19, 1943 |
| 2,332,900 | D'Alelio | Oct. 26, 1943 |
| 2,378,195 | D'Alelio | June 12, 1945 |
| 2,378,197 | D'Alelio | June 12, 1945 |
| 2,441,515 | Snyder | May 11, 1948 |
| 2,441,516 | Snyder | May 11, 1948 |